G. BROWNLEE.
MOTOR SLEIGH.
APPLICATION FILED MAY 20, 1920.
1,390,084.
Patented Sept. 6, 1921.
2 SHEETS—SHEET 2.
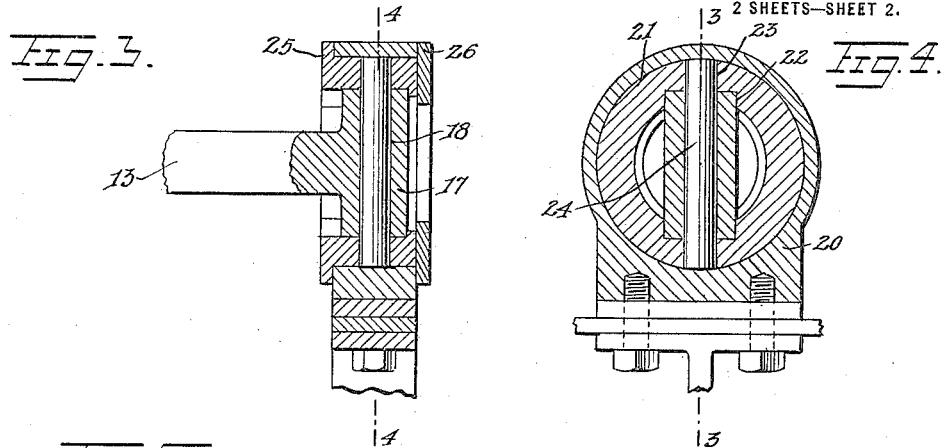
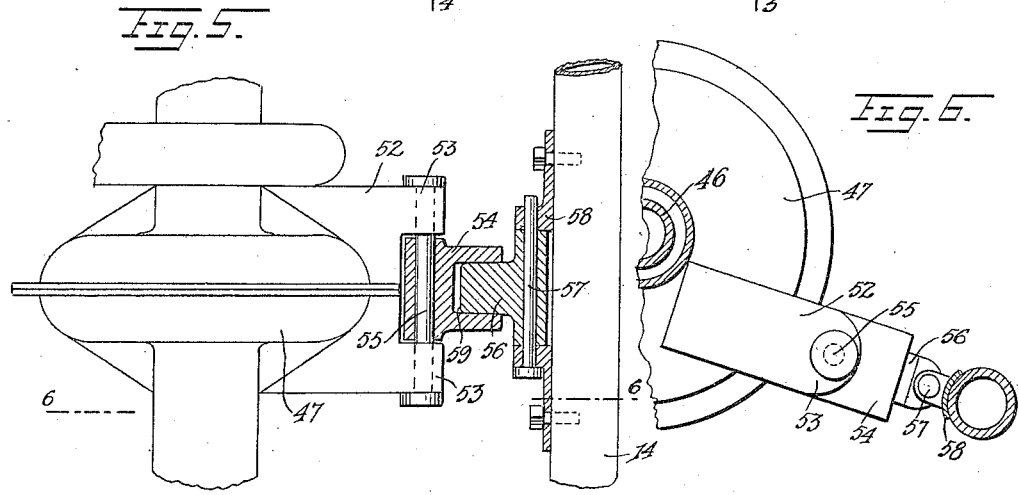
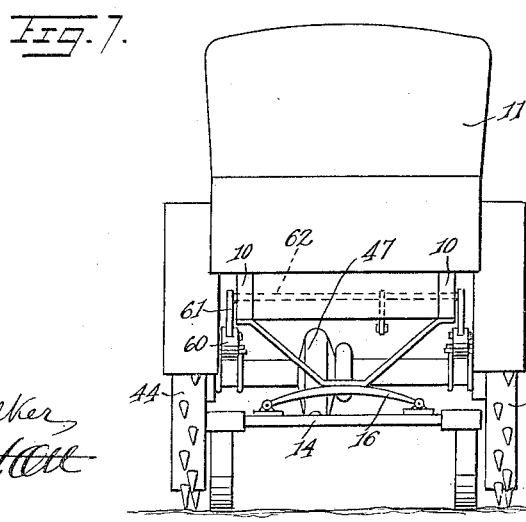
WITNESSES
H. J. Walker
Hugh H. Hall
INVENTOR
GEORGE BROWNLEE
BY Munn & Co
ATTORNEYS

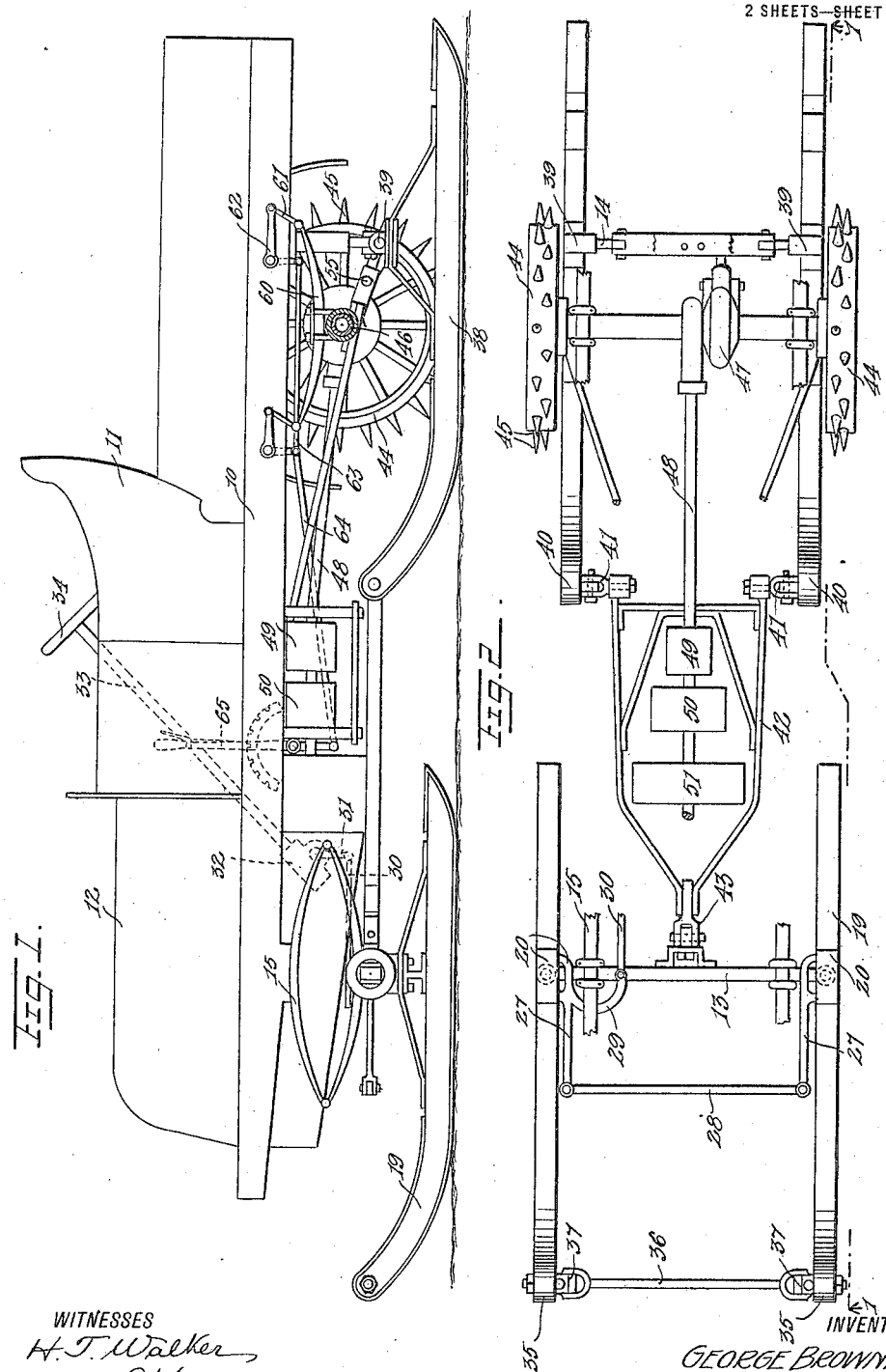

UNITED STATES PATENT OFFICE.

GEORGE BROWNLEE, OF VICTORIA, BRITISH COLUMBIA, CANADA.

MOTOR-SLEIGH.

1,390,084. Specification of Letters Patent. Patented Sept. 6, 1921.

Application filed May 20, 1920. Serial No. 382,914.

*To all whom it may concern:*

Be it known that I, GEORGE BROWNLEE, a subject of Great Britain, and resident of Victoria, Province of British Columbia, in the Dominion of Canada, have invented a new and Improved Motor-Sleigh, of which the following is a full, clear, and exact description.

This invention relates to motor vehicles and more particularly to a motor sleigh or vehicle for traveling on ice or snow.

The principal objection to vehicles of this character which have been heretofore designed has been due to the inflexibility of the connections between the surface engaging elements and the body.

It is therefore one of the principal objects of the present invention to provide an improved running gear for this type of vehicle, which particularly fits the same for travel over uneven surfaces, with the transmission of a minimum amount of shocks and jars to the vehicle body.

Another object of the invention is to provide means operable from the driver's seat for controlling and regulating the engagement of the traction elements with the ground surface or to permit of its entire disengagement therefrom in order to obviate the necessity of cutting off the motor when it is desired to bring the vehicle to a stop.

A further object of the present invention is to provide an improved steering mechanism for a vehicle of this type which facilitates and renders the same easy to control.

A still further object of the invention is to provide means for supporting the traction elements and driving means therefor by a suitable connection which does not impair the flexibility of the ground engaging and supporting elements.

Another object of the invention is to provide a device of the character described which is simple in construction, inexpensive to manufacture and which thoroughly and efficiently performs the functions for which it is intended.

With the above recited and other objects in view, some of which will be more apparent hereafter, reference is made to the following description, claims and accompanying drawings forming a part of this application and in which, Figure 1 is a side elevation of the sleigh constructed in accordance with the invention, the rear axle being shown in section in order to disclose the underlying structure.

Fig. 2 is a plan view of the vehicle with the body removed.

Fig. 3 is an enlarged detail sectional view of the connection between the front bolster and the front runners taken approximately on the line 3—3 of Fig. 4.

Fig. 4 is a similar view thereof taken approximately on the line 4—4 of Fig. 3.

Fig. 5 is an enlarged fragmentary detail view of the supporting connection between the traction wheel, axle and the rear bolster.

Fig. 6 is an enlarged side elevation thereof.

Fig. 7 is a rear view of the vehicle.

Referring to the drawings by characters of reference, which denote like parts throughout the several views thereof, 10 designates the chassis frame upon which is mounted the body 11 having a hood 12 in which the motor is housed. The running gear for the vehicle includes the front and rear bolsters 13 and 14, which support the chassis and body through the medium of the shock absorbing elliptical springs 15 and 16 interposed therebetween. The opposite ends of the front bolster are formed with vertical bosses 17 which are apertured as at 18. The front runners 19 have secured to the upper surface thereof the ring bearings 20 which receive the ring knuckle 21, said ring knuckle 21 having a recess 22 for the reception of the extremities of the boss 17. The ring knuckles are further provided with diametrically disposed radial openings 23 which aline with each other and with the vertical aperture 18 in the boss 17. A knuckle pin 24 is adapted to pass through the openings 18 and 23 whereby to associate the front runners 19 on the front bolster 13 for independent turning and longitudinal rocking movements. The ring knuckles 21 are provided at one side with an annular flange 25 and have secured to their opposite side an annular plate 26, the outer periphery of which constitutes a flange which functions to retain the ring knuckle within the ring bearing against displacement. The ring knuckles are each provided with a steering knuckle arm 27 rigidly secured thereto, the free extremities of said arms being connected by a tie rod 28. One of the steering knuckle arms is formed with a knuckle thrust arm 29 which is connected by the link 30 to the steering arm 31 of a steering device 32. The steering device 32 is of the standard construction and is provided with the steering column 33 upon the upper end of which is mounted the steering wheel 34. The forward upturned ends 35 of the front runners 19 are connected to each other by a connecting rod 36 having a universal swivel joint connection 37 between its opposite ends and the ends 35 of said runners. By this arrangement it will be seen, that while the runners are associated with the front bolster for independent longitudinal rocking movement, the same are simultaneously turned by the steering wheel to control the direction of travel of the vehicle. The rear supporting runners 38 are respectively associated with the opposite ends of the rear bolster 14 for independent longitudinal rocking movements by means of the swivel joints 39. The forward ends 40 of the rear runners are respectively connected by a universal swivel joint 41 to the reach frame 42, the forward extremity of which is connected by means of a universal swivel joint 43 to the medial portion of the front bolster.

The traction wheels 44 for driving the vehicle are provided with radial spikes 45 projecting from their peripheries and the same are mounted upon transverse driving axles 46 connected to the differential (not shown) arranged in the differential housing 47. A drive shaft 48 having the usual universal joint 49, transmission 50 and fly wheel 51 establishes operative connection between the motor (not shown) and the differential for driving the traction wheels. In order to provide a supplemental flexible supporting connection between the differential housing 47 and the rear bolster 14, the differential housing is provided with a rearwardly extending boss 52 having alined apertured hinge knuckles 53, between which is received the apertured female coupling member 54. A pin 55 is adapted to pass through the apertures in the hinge knuckles and the coupling member. A male coupling member 56 is hinged for vertical movements by a pin 57 to the bracket 58, secured to the rear bolster. The male coupling member is received by a recess 59 in the female coupling member. By this arrangement the differential housing and axle housing are associated with the rear bolster in such a manner as to provide for an additional support while at the same time permitting of free relative movements of the same.

The driving axle housing is secured to the elliptical springs 60, the opposite extremities of which are connected by the links 61 to one extremity of the bell cranks 62. The opposite extremities of the bell cranks are respectively connected to an operating rod 63 connected to a link 64. The free end of the link is secured to a lever 65 which is positioned adjacent the driver's seat for effecting vertical adjustments of the traction wheels.

While there has been illustrated and described a single and preferred embodiment of the invention, no limitation is made to the precise details of construction and it is understood that variations and modifications which fall within the scope of the appended claims may be resorted to when found expedient.

Having thus described my invention, I claim as new and desire to secure by Letters Patent:—

1. In a motor sleigh, a body, bolsters secured thereto, supporting runners carried by the bolsters, means for connecting the runners to the bolsters to permit of independent relative movements of the same, a traction driving mechanism, means for effecting vertical adjustments of the same with respect to the body and the running gear, a supplemental swinging supporting connection between the driving mechanism and the rear bolster having limited swinging movement, said connection consisting of interengageable male and female members, the said means for effecting vertical adjustments of the driving mechanism comprising double bell crank levers having connection at one end with the traction elements, and a lever pivoted adjacent the driver's seat having connection with the opposite ends of said bell cranks.

2. In a running gear for motor sleighs, front and rear bolsters, front and rear runners, a universal connection between the rear runners and the front bolsters, means for associating the rear runners with the rear bolster for independent longitudinal rocking movements, means for associating the front runners for independent longitudinal rocking movement and simultaneous turning movement, a vehicle body supported by the bolsters, traction elements supported by the body, a driving mechanism therefor, an auxiliary limited swinging supporting connection between the running gear and the driving mechanism, and means for effecting vertical adjustment of the traction elements and driving mechanism with respect to the running gear and body.

3. A motor sleigh comprising a body, front and rear bolsters, a pair of front runners respectively associated with the opposite ends of the front bolsters for independent turning movement and longitudinal rocking movement, rear runners respectively associated with the opposite ends of the rear bolster for independent longitudinal rocking movements, universal connecting means coupling the front bolster and the forward ends of the rear runners, a driving axle, means for adjustably supporting the same from the body, traction wheels keyed to the opposite ends of the driving axle, a motor carried by the body, a drive shaft constituting means for transmitting power from said motor to the axle and an auxiliary limited swinging supporting connection between the axle and the rear bolster, said connection comprising a female socket member pivoted to the axle, and a male member having a projection received by the socket member and pivoted to the rear bolster.

GEORGE BROWNLEE.